United States Patent
Tanigawa et al.

(10) Patent No.: US 11,969,774 B2
(45) Date of Patent: Apr. 30, 2024

(54) CHECK VALVE, AIR-CONDITIONING APPARATUS, AND METHOD OF MANUFACTURING CHECK VALVE

(71) Applicant: Mitsubishi Electric Corporation, Tokyo (JP)

(72) Inventors: Tsukasa Tanigawa, Tokyo (JP); Hideki Takeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 462 days.

(21) Appl. No.: 17/431,781

(22) PCT Filed: Mar. 28, 2019

(86) PCT No.: PCT/JP2019/013540
§ 371 (c)(1),
(2) Date: Aug. 18, 2021

(87) PCT Pub. No.: WO2020/194646
PCT Pub. Date: Oct. 1, 2020

(65) Prior Publication Data
US 2022/0134407 A1 May 5, 2022

(51) Int. Cl.
*B21D 26/033* (2011.01)
*B21J 5/06* (2006.01)
(Continued)

(52) U.S. Cl.
CPC ............. *B21D 26/033* (2013.01); *B21J 5/06* (2013.01); *B21K 1/24* (2013.01); *F16K 15/02* (2013.01);
(Continued)

(58) Field of Classification Search
CPC . B21D 26/033; B21J 5/06; B21K 1/24; F16K 15/02; F16K 15/021; F16K 15/023; Y10T 137/7913; Y10T 137/7904
See application file for complete search history.

(56) References Cited

U.S. PATENT DOCUMENTS

| | | | | | |
|---|---|---|---|---|---|
| 1,785,271 | A | * | 12/1930 | Lemex | F16K 15/063 137/542 |
| 2,744,727 | A | * | 5/1956 | Osburn | E21B 21/10 137/454.2 |

(Continued)

FOREIGN PATENT DOCUMENTS

| | | |
|---|---|---|
| JP | S59-163270 U | 11/1984 |
| JP | H10-238640 A | 9/1998 |

(Continued)

OTHER PUBLICATIONS

Extended European Search Report dated Mar. 10, 2022 issued in corresponding European Patent Application No. 19921529.4.
(Continued)

*Primary Examiner* — Craig M Schneider
*Assistant Examiner* — Frederick D Soski
(74) *Attorney, Agent, or Firm* — POSZ LAW GROUP, PLC

(57) ABSTRACT

A check valve includes a container body and a valve body. The container body includes a cylindrical valve-body housing portion, an inlet portion, an outlet portion, and a valve seat. The inlet portion is formed at one end portion of the valve-body housing portion, and the outlet portion is formed at the other end portion of the valve-body hosing portion. The valve seat is protruded at an inner circumferential surface of the valve-body housing portion. The valve body is provided in the container body and movable in the axial direction thereof.

4 Claims, 3 Drawing Sheets

(51) Int. Cl.
  *B21K 1/24* (2006.01)
  *F16K 15/02* (2006.01)
(52) U.S. Cl.
  CPC .... *Y10T 137/7904* (2015.04); *Y10T 137/7913* (2015.04)

(56) References Cited

U.S. PATENT DOCUMENTS

| | | | | |
|---|---|---|---|---|
| 3,794,077 | A * | 2/1974 | Fanshier | F16K 17/30 137/513.3 |
| 4,958,657 | A * | 9/1990 | Hagan | F16K 15/063 137/513.5 |
| D576,704 | S * | 9/2008 | Gilcher | D23/233 |
| D725,747 | S * | 3/2015 | Alexander | D23/233 |
| D728,072 | S * | 4/2015 | Alexander | D23/233 |
| D739,919 | S * | 9/2015 | Alexander | D23/233 |
| 9,644,356 | B1 * | 5/2017 | Gass | E03B 7/078 |
| 11,524,908 | B2 * | 12/2022 | Pohjola | F16K 1/38 |
| 2022/0134407 | A1 * | 5/2022 | Tanigawa | B21J 5/08 72/58 |
| 2023/0160481 | A1 * | 5/2023 | Tanigawa | B23P 15/001 137/528 |

FOREIGN PATENT DOCUMENTS

| | | |
|---|---|---|
| JP | 2001-324037 A | 11/2001 |
| JP | 2002-301521 A | 10/2002 |
| JP | 2003-154414 A | 5/2003 |
| JP | 2006-046538 A | 2/2006 |
| JP | 2006-220233 A | 8/2006 |
| JP | 2013-044418 A | 3/2013 |
| JP | 2013-158802 A | 8/2013 |

OTHER PUBLICATIONS

International Search Report of the International Searching Authority dated Jun. 4, 2019 in corresponding International Patent Application No. PCT/JP2019/013540 (and English translation).

* cited by examiner

CHECK VALVE, AIR-CONDITIONING APPARATUS, AND METHOD OF MANUFACTURING CHECK VALVE

CROSS REFERENCE TO RELATED APPLICATION

This application is a U.S. national stage application of PCT/JP2019/013540 filed on Mar. 28, 2019, the contents of which are incorporated herein by reference.

TECHNICAL FIELD

The present disclosure relates to a check valve for use in, for example, a refrigeration cycle circuit in an air-conditioning apparatus, and to a method of manufacturing the check valve.

BACKGROUND ART

An air-conditioning apparatus includes a compressor, a condenser, an expansion valve, an evaporator, and other units, and is provided with a refrigeration cycle circuit that circulates refrigerant. Furthermore, in such a refrigeration cycle circuit, a check valve may be provided to allow the refrigerant that flows in the refrigeration cycle to flow only one direction (see, for example, Patent Literature 1).

CITATION LIST

Patent Literature

Patent Literature 1: Japanese Unexamined Patent Application Publication No. 2013-44418

SUMMARY OF INVENTION

Technical Problem

An existing check valve is made up of many components that are a tubular body, a valve body, a guide member, a valve seat member, and a seal member, as described in Patent Literature 1. Therefore, since the number of components is large, a larger number of manufacturing steps are required, and the manufacturing cost is thus high.

The present disclosure is applied to solve the above problem, and relates to a check valve that includes a smaller number of components, and is manufactured at simplified manufacturing steps, whereby the manufacturing cost of the check valve is reduced

Solution to Problem

A check valve according to an embodiment of the present disclosure includes a container body and a valve body. The container body includes a cylindrical valve-body housing portion, an inlet portion, an outlet portion, and a valve seat. The inlet portion is formed at one end portion of the valve-body housing portion, and the outlet portion is formed at the other end portion of the valve-body housing portion. The valve seat is protruded at an inner circumferential surface of the valve-body housing portion. The valve body is provided in the container body and movable in an axial direction thereof.

Advantageous Effects of Invention

In the check valve according to the embodiment of the present disclosure, the number of components can be reduced, the manufacturing steps can be simplified, and the manufacturing cost can thus be reduced lower than that of an existing check valve.

BRIEF DESCRIPTION OF DRAWINGS

FIG. 2 includes sectional views illustrating respective sections of the check valve 1 according to Embodiment 1 of the present disclosure that are obtained in respective manufacturing steps.

DESCRIPTION OF EMBODIMENTS

A check valve according to an embodiment of the present disclosure will be described with reference to the above figures. In each of the figures, components that are the same as or equivalent to those in a previous figure or figures are denoted by the same reference signs, and their descriptions will be omitted or simplified as appropriate. The shapes, sizes, arrangements, etc., of the configurations as illustrated in the figures can be changed as appropriate within the scope of the present disclosure.

Embodiment 1

Figure 1:
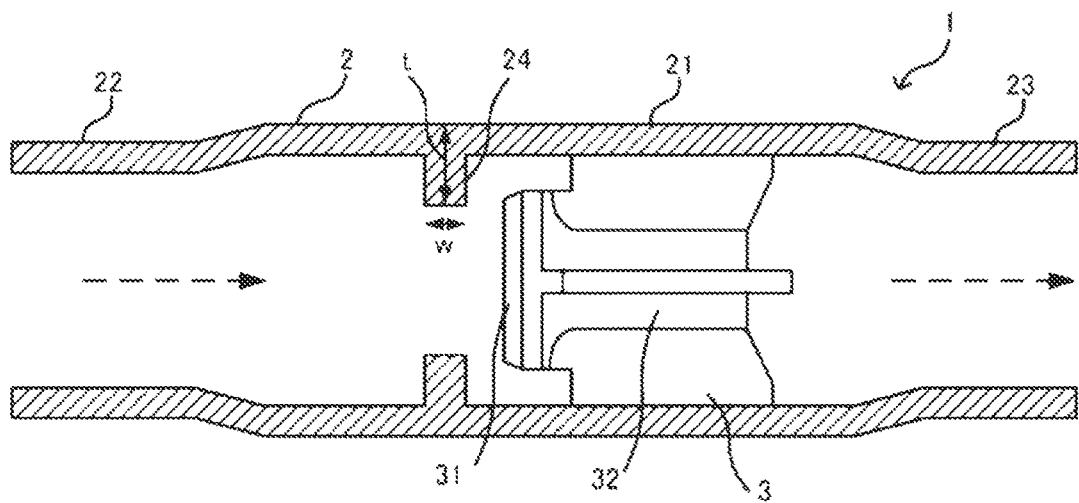
FIG. 1 is a section view of a check valve according to Embodiment 1 of the present disclosure.

FIG. 1 is a sectional view of a check valve 1 according to Embodiment 1 of the present disclosure. The check valve 1 is provided in a refrigeration cycle circuit of an air-conditioning apparatus, and has functions of preventing backflow of refrigerant and limiting the flow direction of the refrigerant to only one direction.

The check valve 1 includes a hollow cylindrical container body 2 and a valve body 3 that is movable in the axial direction of the check valve 1 and provided in the container body 2.

The container body 2 is formed of a raw tube made of copper, and forms a main body of the check valve 1. The container body 2 includes a cylindrical valve-body housing portion 21 that houses the valve body 3, an inlet portion 22 that is formed at an one end portion of the valve-body housing portion 21 and serves as an inlet for refrigerant, and an outlet portion 23 that is formed at another end portion of the valve-body housing portion 21 and serves as an outlet for the refrigerant. The container body 2 further includes a valve seat 24 that protrudes at an inner circumferential surface of the valve-body housing portion 21.

The valve-body housing portion 21 houses the valve body 3 in the inside thereof and includes the valve seat 24 located closer to the inlet portion 22 than the valve body 3. The valve-body housing portion 21 has such a certain length as to allow the valve body 3 to be moved in the axial direction, depending on the flow direction of the refrigerant.

The inlet portion 22 is formed at the above one end portion of the valve-body housing portion 21 in a longitudinal direction thereof. The inlet portion 22 serves as the inlet for the refrigerant when the refrigerant flows in the check valve 1 as indicated by the arrows in FIG. 1. The outlet portion 23 is formed at the above other end portion of the valve-body housing portion 21 in the longitudinal direction. The outlet portion 23 serves as the outlet for the refrigerant when the refrigerant flows in the check valve 1 as indicated by the arrows in FIG. 1. The inlet portion 22 and the outlet portion 23 can be formed by tube-reducing processing or other methods, and the inside diameter of each of the inlet portion 22 and the outlet portion 23 is smaller than that of the valve-body housing portion 21.

The valve seat 24 is protruded at the inner circumferential surface of the valve-body housing portion 21 and is a gathered portion thicker than the other portion. The inside diameter of the valve seat 24 is smaller than that of part of the valve-body housing portion 21 that is other than the valve seat. The valve seat 24 is formed integrally with the container body 2 by hydroforming process, which will be described below.

The valve body 3 is provided between the valve seat 24 and the outlet portion 23 in the container body 2, and is moved in the axial direction in the valve-body housing portion 21, depending on the flow direction of the refrigerant. When the refrigerant flows from the inlet portion 22 toward the outlet portion 23, the valve body 3 is moved toward the outlet side in the valve-body housing portion 21 to allow the refrigerant to pass through the check valve 1. By contrast, when the refrigerant flows from the outlet portion 23 toward the inlet portion 22, the valve body 3 is moved toward the inlet side in the valve-body housing portion 21 and brought into contact with the valve seat 24 to prevent backflow of the refrigerant in the check valve 1.

The valve body 3 can be made of resin or other materials, and includes a valve portion 31 that is to be brought into contact with the valve seat 24 and a guide portion 32 including a plurality of vanes. To be more specific, the valve portion 31 is brought into contact with the valve seat 24 to prevent backflow of the refrigerant from the outlet portion 23 toward the inlet portion 22. The guide portion 32 has a function of guiding the valve body 3 when the valve body 3 is moved in the axial direction in the valve-body housing portion 21. The outside diameter of the guide portion 32 is nearly equal to the inside diameter of the valve-body housing portion 21. The guide portion 32 includes the plurality of vanes, and when the refrigerant flows from the inlet portion 22 toward the outlet portion 23, the refrigerant passes between the vanes. It should be noted that in Embodiment 1, the guide portion 32 includes four vanes that are arranged at 90-degree intervals.

Next, a method of manufacturing the check valve 1 according to Embodiment 1 will be described. FIG. 2 includes sectional views illustrating respective sections of the check valve 1 according to Embodiment 1 of the present disclosure that are obtained in respective manufacturing steps.

Figure 2A:
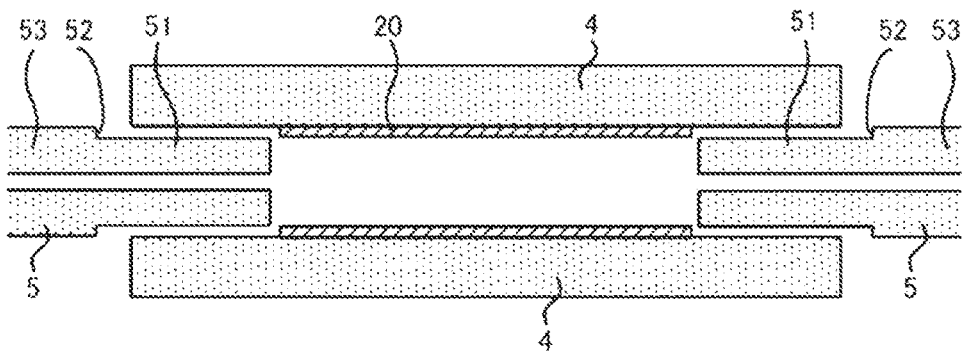
FIG. 2a is a sectional view illustrating a section of the check valve according to Embodiment 1 of the present disclosure that is obtained in a manufacturing step.

As illustrated in FIG. 2a, first, a cylindrical raw tube 20 that will be formed into the container body 2 is placed and held between outer dies 4, 4. In Embodiment 1, a hollow copper tube having a thickness of approximately 1.5 mm is used as the raw tube 20.

Figure 2B:
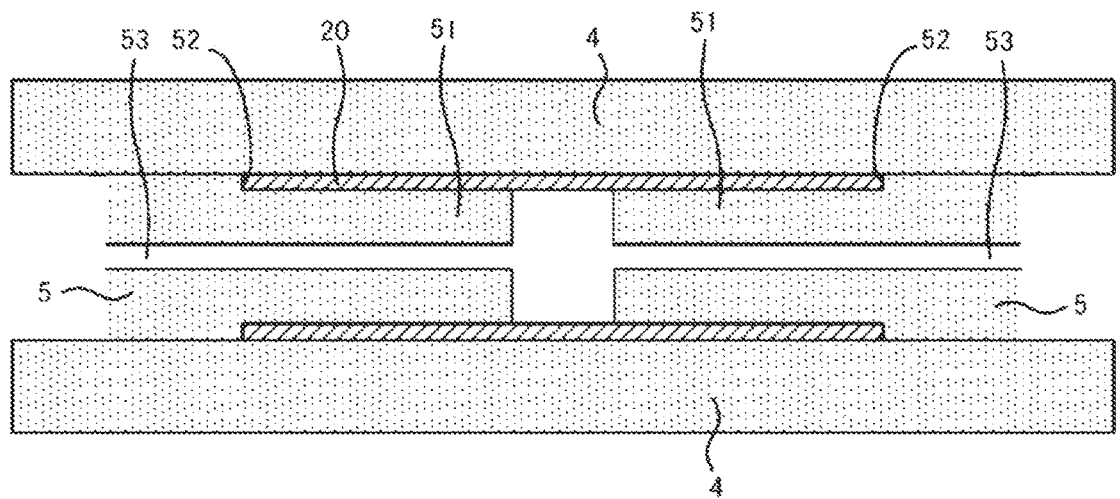
FIG. 2b is a sectional view illustrating a section of the check valve according to Embodiment 1 of the present disclosure that is obtained in a subsequent manufacturing step following the above manufacturing step.

Next, as illustrated in FIG. 2b, axial push tools 5 are pushed into the raw tube 20 from respective opposite ends of the raw tube 20, thereby fixing the raw tube 20. The axial push tools 5 each include an insertion portion 51 that is to be inserted into the raw tube 20, a press portion 52 that is to be pressed against an associated one of end faces of the raw tube 20, and a nozzle hole 53 for use in feeding fluid such as water into the raw tube 20. The outside diameter of the insertion portion 51 is nearly equal to the inside diameter of the raw tube 20. Thus, when the insertion portions 51 of the axial push tools 5 are inserted from the respective ends of the raw tube 20 into the raw tube 20, outer surfaces of the insertion portions 51 are brought into contact with an inner surface of the raw tube 20, and the raw tube 20 is held between the insertion portions 51 and the dies 4. In this step, each of the axial push tools 5 is pushed until the press portion 52 is brought contact with the associated end face of the raw tube 20.

Figure 2C:
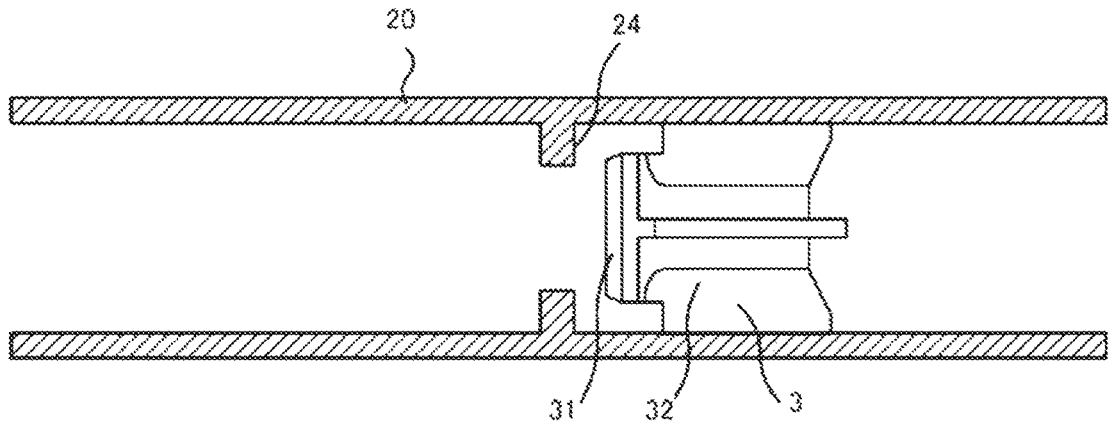
FIG. 2c is a sectional view illustrating a section of the check valve according to Embodiment 1 of the present disclosure that is obtained in a further subsequent manufacturing step following the above subsequent manufacturing step.

Next, as illustrated in FIG. 2c, the inside of the raw tube 20 is filled with fluid, such as water, supplied through the nozzle hole 53, and an internal pressure is applied to the raw tube 20. The arrows in FIG. 2c indicates how the fluid flows into the raw tube 20 through the nozzle hole 53.

Figure 2D:
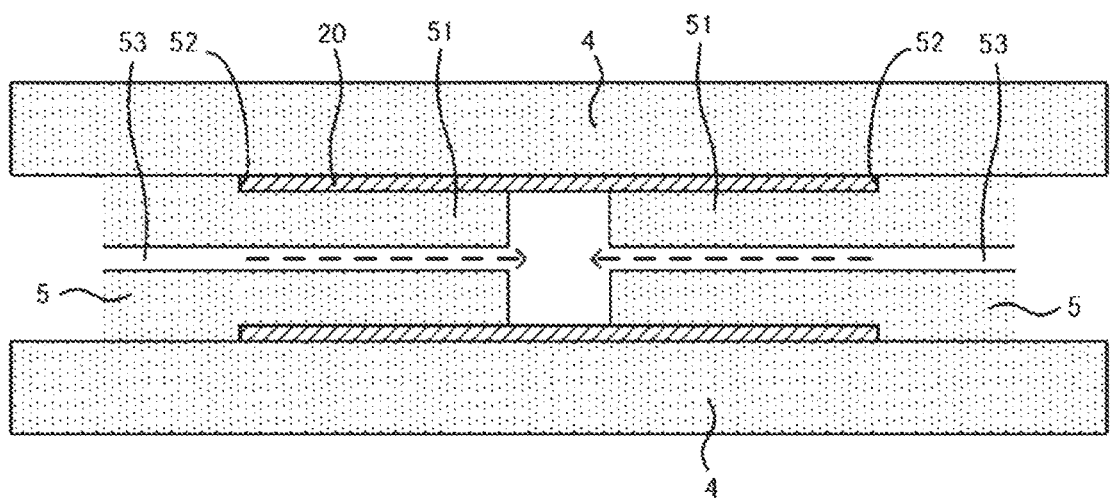
FIG. 2d is a sectional view illustrating a section of the check valve according to Embodiment 1 of the present disclosure that is obtained in still further subsequent manufacturing step following the above further manufacturing step.

Next, as illustrated in FIG. 2d, the axial push tools 5 are further pushed from the opposite ends of the raw tube 20 than in the step as illustrated in FIG. 2b, with the inside of the raw tube 20 filled with the fluid. Because the raw tube 20 is pushed by the press portions 52 from the opposite ends, part of the raw tube 20 is gathered and drawn to part of the raw tube 20 that is not in contact with the insertion portions 51, whereby the valve seat 24 is formed. At this time, the axial push tools 5 are pushed from the opposite ends while an internal pressure is applied by the fluid to the raw tube 20 from the inside thereof, whereby the valve seat 24 can be formed without buckling. It should be noted that the processing using the fluid as described with reference to FIGS. 2c and 2d will be referred to as hydroforming process or hydroforming. In Embodiment 1, the valve seat 24 is formed at the inner circumferential surface of the raw tube 20 by performing the hydroforming process.

Figure 2E:
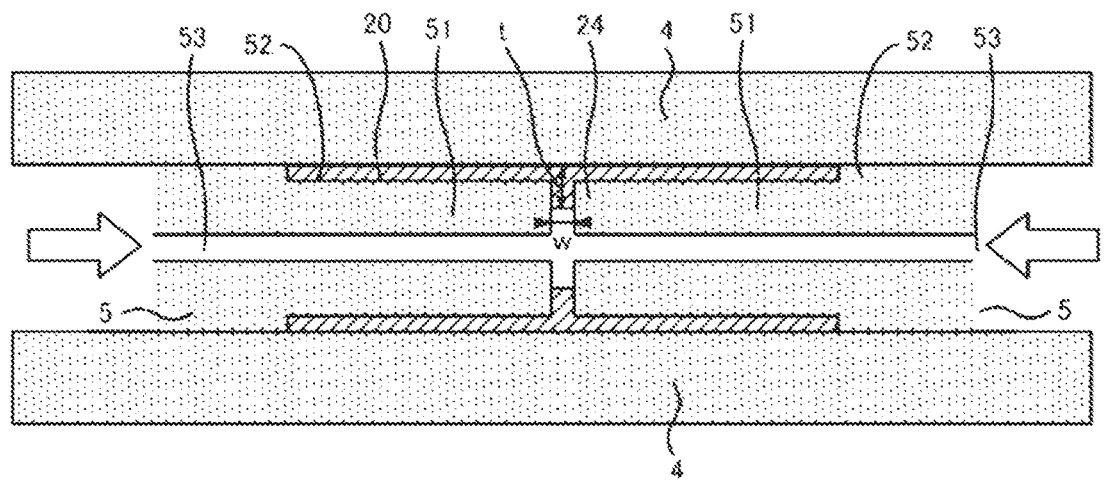
FIG. 2e is a sectional view illustrating a section of the check valve according to Embodiment 1 of the present disclosure that is obtained in yet further subsequent manufacturing step following the above still further subsequent manufacturing step.

After the valve seat 24 is formed, the raw tube 20 is detached from the dies 4 and the axial push tools 5, as illustrated in FIG. 2e, and the valve body 3 is inserted into the raw tube 20 such that the valve portion 31 is inserted first.

Figure 2F:
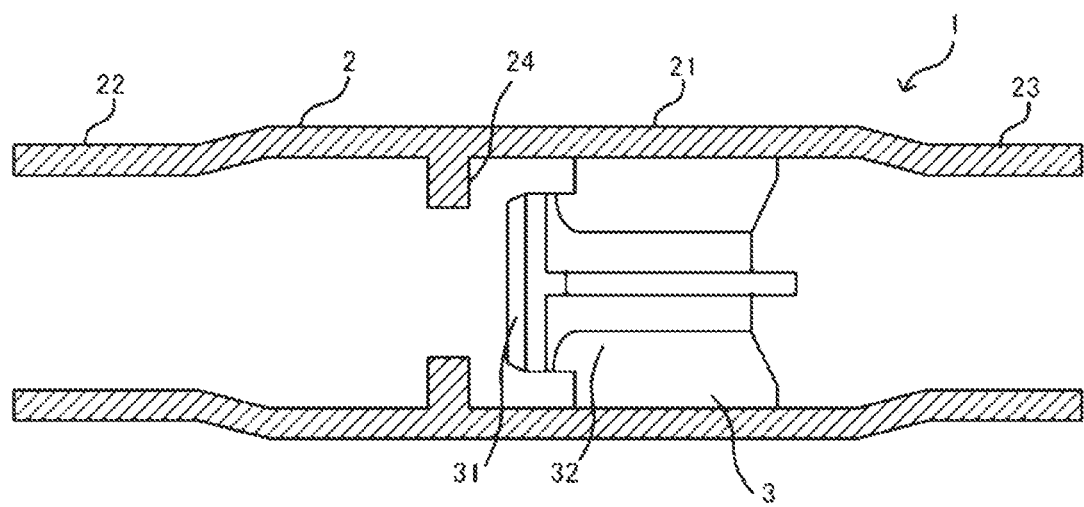
FIG. 2f is a sectional view illustrating a section of the check valve according to Embodiment 1 of the present disclosure that is obtained in the last manufacturing step following the above yet further subsequent manufacturing step.

Lastly, as illustrated in FIG. 2f, the opposite end portions of the raw tube 20 are formed into the inlet portion 22 and the outlet portion 23 by tube-reducing processing or other processing. As described above, the check valve 1 according to Embodiment 1 is formed through the manufacturing steps illustrated in FIGS. 2a to 2f.

According the above manufacturing method, the valve seat 24 is formed integrally with the container body 2 by the hydroforming process, and the check valve 1 according to the present disclosure can thus be made up of two elements that are the container body 2 and the valve body 3. Therefore, as compared with existing check valves, the number of components can be reduced, the manufacturing steps can be simplified, and the manufacturing cost can thus be reduced.

The width w and the thickness t of the valve seat 24 can be adjusted by adjusting the degree to which the axial push tools 5 are each pushed and the length of the insertion portion 51 of each axial push tool 5. To be more specific, the width w of the valve seat 24 is equal to the distance between distal ends of the insertion portions 51 of the two axial push tools 5 that are located when the axial push tools 5 are pushed, as illustrated in FIG. 2d. The thickness t of the valve seat 24 is determined based on the width w and the degree to which each of the axial push tools 5 is pushed in the step as illustrated in FIG. 2d. That is, because the volume of the raw tube 20 before the step as illustrated in FIG. 2d is equal to that after the step as illustrated in FIG. 2d, part of the raw tube 20 that is pushed by each axial push tool 5 is gathered and drawn to part of the raw tube 20 that is not in contact with the insertion portion 51, thereby forming the valve seat 24. Therefore, the width w and the thickness t of the valve seat 24 can be adjusted by adjusting the degree to which the axial push tool 5 is pushed and the length of the insertion portion 51 of the axial push tool 5.

In Embodiment 1 described above, after the step of filling the inside of the raw tube 20 with the fluid as illustrated in FIG. 2c is carried out, the step of further pushing the axial push tools 5 from the opposite ends of the raw tube 20 as illustrated in FIG. 2d is carried out. The order in which the above steps are carried out is not limited to that in the above example, and may be any order as long as the axial push tools 5 are not pushed from the opposite ends of the raw tube 20 without applying a pressure to the raw tube 20 from the inside thereof. For example, the step of filling the inside of the raw tube 20 with the fluid and the step of further pushing the axial push tools 5 from the opposite ends of the raw tube 20 may be simultaneously performed.

The check valve 1 according to Embodiment 1 is mounted on an air-conditioning apparatus provided with a refrigeration cycle circuit that includes at least a compressor, a condenser, an expansion valve, and an evaporator.

As described above, the check valve 1 according to Embodiment 1 includes the container body 2 and the valve body 3. The container body 2 includes the cylindrical valve-body housing portion 21, the inlet portion 22 formed at the one end portion of the valve-body housing portion 21, the outlet portion 23 formed at the other end portion of the valve-body housing portion 21, and the valve seat 24 protruding at the inner circumferential surface of the valve-body housing portion 21. The valve body 3 is provided in the container body 2 and is movable in the axial direction.

In the above configuration, because the valve seat 24 is formed integrally with the container body 2, the check valve 1 can be made up of two elements that are the container body 2 and the valve body 3.

In the check valve 1 according to Embodiment 1, the valve seat 24 is formed integrally with the container body 2 by the hydroforming process. In this configuration, as compared with existing check valves, the number of components can be reduced, the manufacturing steps can be simplified, and the manufacturing cost can thus be reduced.

In the check valve 1 according to Embodiment 1, the valve body 3 includes the valve portion 31 that is to be brought into contact with the valve seat 24 and the guide portion 32 that includes the plurality of vanes. In this configuration, the valve body 3 can be moved in the axial direction in the valve-body housing portion 21, thereby limiting the flow direction of the refrigerant to only one direction.

The method of manufacturing the check valve 1 according to Embodiment 1 includes the step of placing the raw tube 20 such that the raw tube 20 is held between the dies 4, the step of pushing the axial push tools 5 from the respective opposite ends of the raw tube 20 and fixing the raw tube 20, the step of filling the inside of the raw tube 20 with the fluid, the step of further pushing the axial push tools 5 from the opposite ends of the raw tube 20 to form the valve seat 24 at the inner circumferential surface of the raw tube 20, the step of inserting the valve body 3 into the raw tube 20, and the step of forming the inlet portion 22 and the outlet portion 23 at the respective opposite end portions of the raw tube 20 by performing the tube-reducing processing.

In the check valve 1 manufactured by the above manufacturing method, because the valve seat 24 is formed integrally with the container body 2 by the hydroforming process, the check valve 1 can be made up of two elements that are the container body 2 and the valve body 3. Thus, as compared with existing check valves, the number of components can be reduced, the manufacturing steps can be simplified, and the manufacturing cost can thus be reduced.

In the method of manufacturing the check valve 1 according to Embodiment 1, the axial push tools 5 include the insertion portions 51 that are to be inserted into the raw tube 20, the press portions 52 that are to be pressed against the end faces of the raw tube 20, and the nozzle holes 53 that allows the fluid to be fed into the raw tube 20. The outside diameter of the insertion portion 51 is nearly equal to the inside diameter of the raw tube 20. According to this manufacturing method, the valve seat 24 can be formed integrally with the container body 2 by the hydroforming process.

Furthermore, in the method of manufacturing the check valve 1 according to Embodiment 1, the step of filling the inside of the raw tube 20 with the fluid and the step of further pushing the axial push tools 5 from the respective opposite ends of the raw tube 20 and forming the valve seat 24 at the inner circumferential surface of the raw tube 20 are simultaneously carried out. In this manufacturing method, the valve seat 24 can be formed without buckling.

In the foregoing, the above embodiment is described above, and the technical scope of the present disclosure is not limited to the scope described regarding the above embodiment. Various changes or modifications can be made to the above embodiment within the scope that does not depart from the spirit of the present disclosure. Configurations obtained by making changes or modifications to the embodiment are also covered by the technical scope of the present disclosure.

1: check valve, 2: container body, 3: valve body, 4: die, 5: axial push tool, 21: valve-body housing portion, 22: inlet portion, 23: outlet portion, 24: valve seat, 31: valve portion, 32: guide portion, 51: insertion portion, 52: press portion, 53: nozzle hole, w: width, t: thickness

The invention claimed is:

1. A method of manufacturing a check valve, comprising:
placing a raw tube made of copper such that the raw tube is held in a die;
pushing axial push tools from respective opposite ends of the raw tube, and fixing the raw tube;
filling an inside of the raw tube with fluid;
forming a valve seat at an inner circumferential surface of the raw tube by further pushing the axial push tools from the respective ends of the raw tube, such that between the axial push tools, the valve seat has a greater thickness than part of the raw tube that is other than the valve seat;

inserting a valve body into the raw tube; and forming an inlet portion and an outlet portion at respective opposite end portions of the raw tube by tube-reducing processing, wherein in the forming the valve seat, the raw tube is formed having a nonuniform thickness such that part of the raw tube is gathered inwardly and the raw tube is not deformed outwardly.

2. The method of manufacturing the check valve of claim 1, wherein the axial push tools each includes an insertion portion, a press portion, and a nozzle hole, the insertion portion being inserted into the raw tube, a press portion being pressed against an associated one of end faces of the raw tube, the nozzle hole being a hole for use in feeding the fluid into the raw tube.

3. The method of manufacturing the check valve of claim 2, wherein the insertion portion and the raw tube form a sliding fit.

4. The method of manufacturing the check valve of claim 1, wherein the filling the inside of the raw tube with the fluid and the forming the valve seat are simultaneously performed.

* * * * *